(12) United States Patent
Ito et al.

(10) Patent No.: US 12,630,309 B2
(45) Date of Patent: May 19, 2026

(54) THREE-DIMENSIONAL STRUCTURE SPACECRAFT AND METHOD FOR CONTROLLING THREE-DIMENSIONAL STRUCTURE SPACECRAFT

(71) Applicant: Hitachi, Ltd., Tokyo (JP)

(72) Inventors: Makoto Ito, Tokyo (JP); Yosuke Tanabe, Tokyo (JP); Tsukasa Funane, Tokyo (JP); Hisatoshi Kimura, Tokyo (JP); Koichi Watanabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 19/084,175

(22) Filed: Mar. 19, 2025

(65) Prior Publication Data

US 2025/0333192 A1 Oct. 30, 2025

(30) Foreign Application Priority Data

Apr. 26, 2024 (JP) ................................. 2024-072065

(51) Int. Cl.
*B64G 1/22* (2006.01)

(52) U.S. Cl.
CPC .................................... *B64G 1/222* (2013.01)

(58) Field of Classification Search
CPC ............. B64G 1/10; B64G 1/228; B64G 1/38
See application file for complete search history.

(56) References Cited

U.S. PATENT DOCUMENTS

| | | | | |
|---|---|---|---|---|
| 4,068,238 A * | 1/1978 | Acker | ................. | H01Q 11/086 343/895 |
| 9,815,574 B2 * | 11/2017 | Scolamiero | .......... | B64G 1/2224 |
| 11,359,364 B1 * | 6/2022 | Eller | .................... | H01Q 15/161 |
| 12,420,956 B2 * | 9/2025 | Watanabe | ................ | B64G 1/10 |
| 2015/0151854 A1 * | 6/2015 | Scolamiero | .......... | B64G 1/2224 244/172.6 |

(Continued)

OTHER PUBLICATIONS

Kim, K, Agogino, A. K., Toghyan, A., Moon, D., Taneja, L., Agogino, A. M., Robust Learning of Tensegrity Robot Control for Locomotion through Form-Finding, Sep. 28, 2015-Oct. 2, 2015, https://best.berkeley.edu/wp-content/uploads/2015/07/07354204. pdf (Year: 2015).*

*Primary Examiner* — Arfan Y. Sinaki
(74) *Attorney, Agent, or Firm* — PROCOPIO, CORY, HARGREAVES & SAVITCH LLP

(57) ABSTRACT
A three-dimensional structure spacecraft having a tensegrity structure appropriately controls a vibration even when the three-dimensional structure spacecraft is subjected to air resistance, solar wind disturbance, or the like, lands a satellite or a planet, and performs work or the like. The three-dimensional structure spacecraft includes a plurality of compression members and a plurality of tension members. Three or more of the tension members are connected to each of ends of the compression members. A three-dimensional structure formed by the compression members and the tension members is maintained by tension of the tension members. A variable damping force damper is disposed in at least either the compression members or the tension members. The variable damping force damper is configured to generate a predetermined force in a longitudinal direction of the compression members or in a longitudinal direction of the tension members.

14 Claims, 21 Drawing Sheets

(56)     References Cited

U.S. PATENT DOCUMENTS

| 2015/0194733 | A1* | 7/2015 | Mobrem | ............. | H01Q 15/161 |
| | | | | | 343/915 |
| 2015/0303582 | A1* | 10/2015 | Meschini | ............ | H01Q 15/161 |
| | | | | | 343/840 |
| 2018/0326577 | A1* | 11/2018 | Chen | ........................ | B64G 4/00 |
| 2019/0382995 | A1* | 12/2019 | Chen | .................... | B25J 19/0091 |
| 2023/0050299 | A1* | 2/2023 | Agogino | ................ | B25J 9/1075 |
| 2025/0002177 | A1* | 1/2025 | Tanabe | ..................... | H01Q 1/08 |
| 2025/0110197 | A1* | 4/2025 | Funane | ..................... | G01S 5/02 |

* cited by examiner

FIG. 4

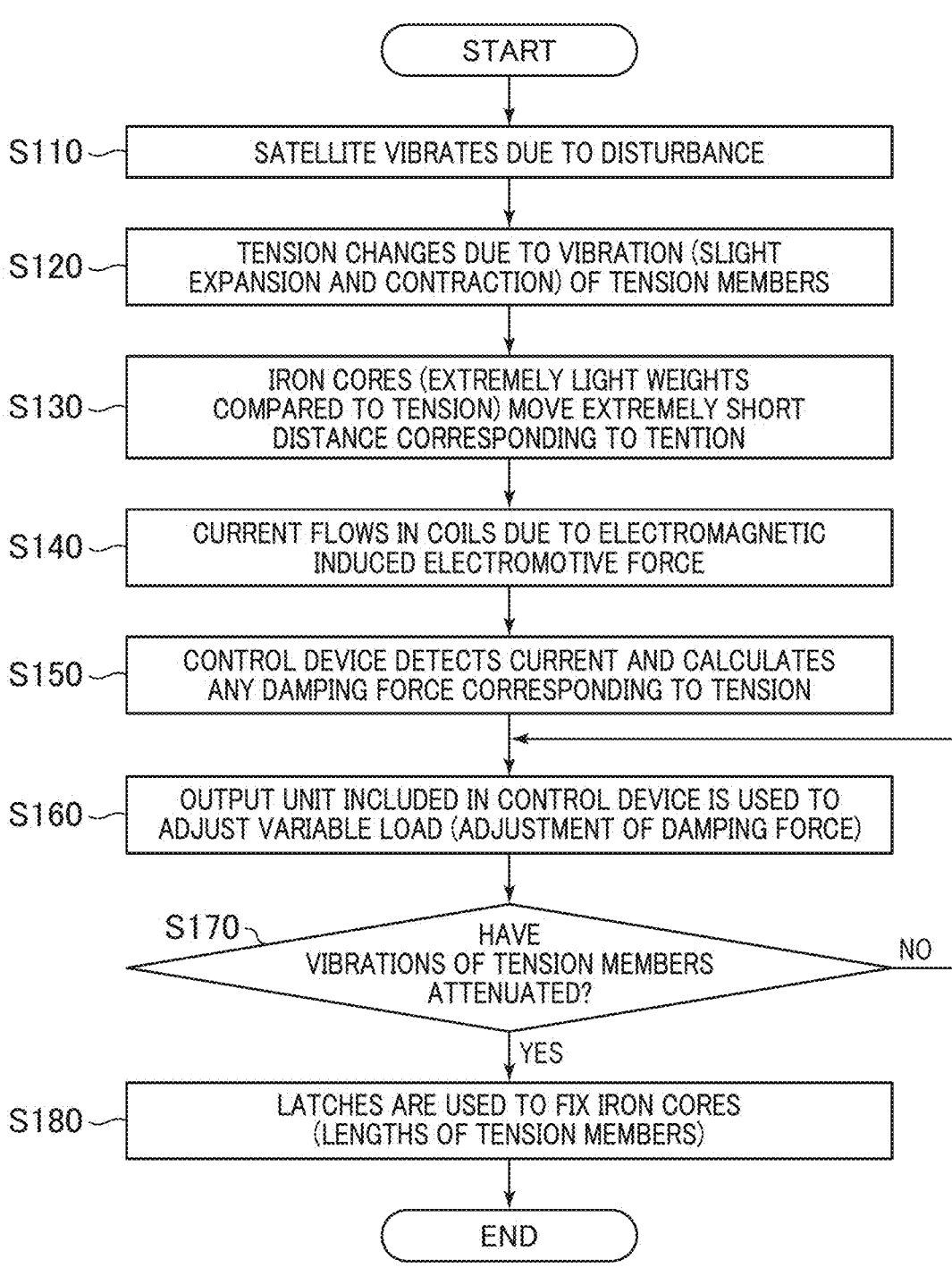

START

S110 — SATELLITE VIBRATES DUE TO DISTURBANCE

S120 — TENSION CHANGES DUE TO VIBRATION (SLIGHT EXPANSION AND CONTRACTION) OF TENSION MEMBERS

S130 — IRON CORES (EXTREMELY LIGHT WEIGHTS COMPARED TO TENSION) MOVE EXTREMELY SHORT DISTANCE CORRESPONDING TO TENTION

S140 — CURRENT FLOWS IN COILS DUE TO ELECTROMAGNETIC INDUCED ELECTROMOTIVE FORCE

S150 — CONTROL DEVICE DETECTS CURRENT AND CALCULATES ANY DAMPING FORCE CORRESPONDING TO TENSION

S160 — OUTPUT UNIT INCLUDED IN CONTROL DEVICE IS USED TO ADJUST VARIABLE LOAD (ADJUSTMENT OF DAMPING FORCE)

S170 — HAVE VIBRATIONS OF TENSION MEMBERS ATTENUATED?     NO

YES

S180 — LATCHES ARE USED TO FIX IRON CORES (LENGTHS OF TENSION MEMBERS)

END

| SYMBOL | DEFINITION |
|--------|------------|
| A →[ G ]→ B | $B = GA$ |
| A ▶○◀ B<br>C ↓ | $C = A + B$ |
| A ▶●→ B<br>C ↓ | $A = B = C$ |
| A ──○──→ B | $B = -A$ |
| A ──▷──→ B | $B = \int A \, dt$ |

FIG. 14A

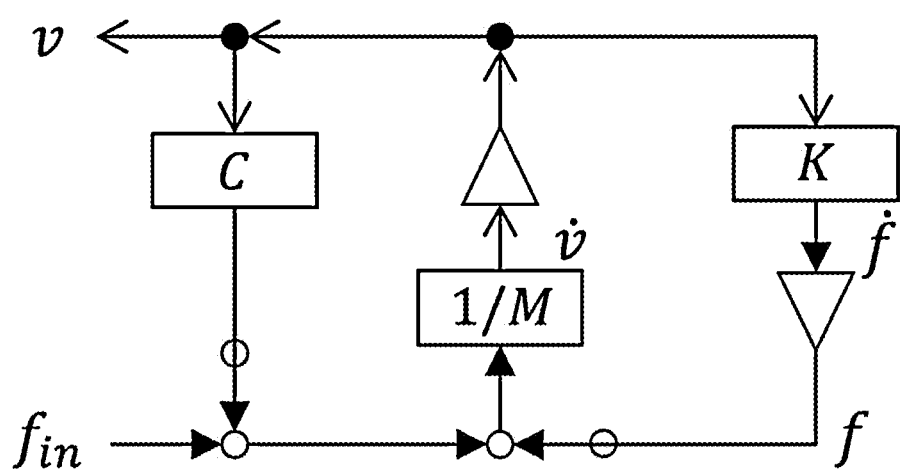

FIG. 14B $$\begin{cases} \dot{v} = -\dfrac{C}{M}v + \dfrac{1}{M}f_{in} - \dfrac{1}{M}f \\[4mm] \dot{f} = Kv \end{cases} \quad \cdots(1)$$

$$\Rightarrow \begin{bmatrix} M & 0 \\ 0 & {}^{1}\!/_{K} \end{bmatrix}\begin{bmatrix} \dot{v} \\ \dot{f} \end{bmatrix} = \begin{bmatrix} -C & -1 \\ 1 & 0 \end{bmatrix}\begin{bmatrix} v \\ f \end{bmatrix} + \begin{bmatrix} f_{in} \\ 0 \end{bmatrix} \quad \cdots(2)$$

$$\Rightarrow \text{TRANSFER FUNCTION} \quad G = \left[ j\omega \begin{bmatrix} M & 0 \\ 0 & {}^{1}\!/_{K} \end{bmatrix} + \begin{bmatrix} C & 1 \\ -1 & 0 \end{bmatrix}\right]^{T} \quad \cdots(3)$$

FIG. 15A

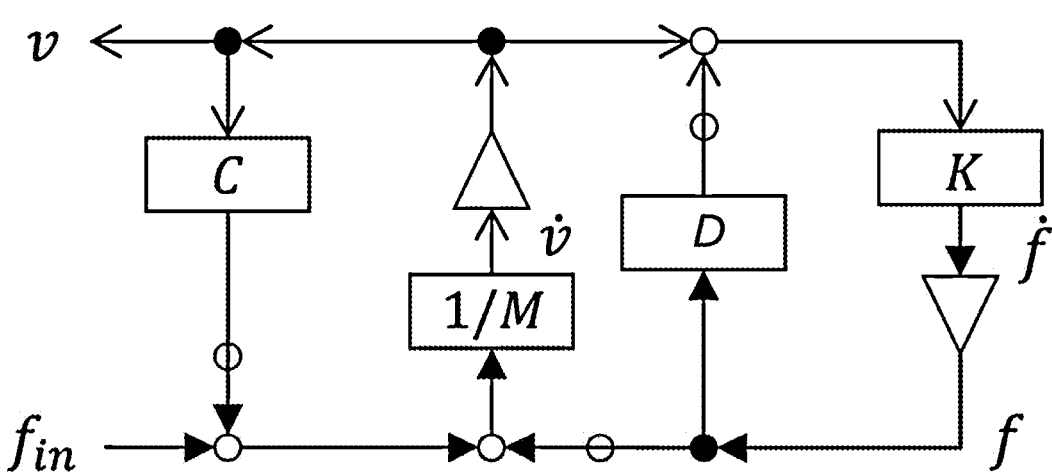

FIG. 15B $$\begin{bmatrix} M & 0 \\ 0 & 1/K \end{bmatrix}\begin{bmatrix} \dot{v} \\ \dot{f} \end{bmatrix} = \begin{bmatrix} -C & -1 \\ 1 & -D \end{bmatrix}\begin{bmatrix} v \\ f \end{bmatrix} + \begin{bmatrix} f_{in} \\ 0 \end{bmatrix} \quad \cdots (4)$$

$\Rightarrow$ TRANSFER FUNCTION $\quad G = \left[ j\omega \begin{bmatrix} M & 0 \\ 0 & 1/K \end{bmatrix} + \begin{bmatrix} C & 1 \\ -1 & D \end{bmatrix} \right]^T \quad \cdots (5)$

FIG. 18C

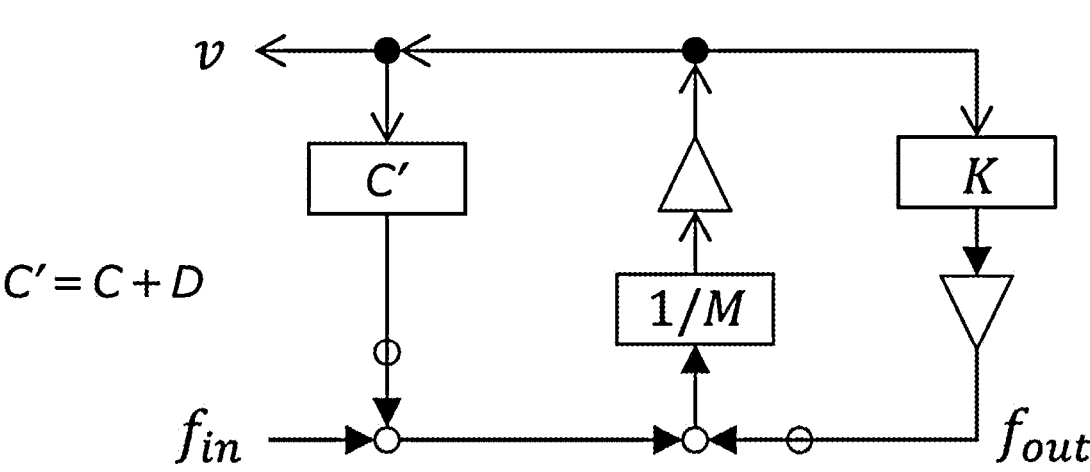

$$C' = C + D$$

FIG. 18D $$\begin{bmatrix} \dot{v} = -\dfrac{C+D}{M}v + \dfrac{1}{M}f_{in} - \dfrac{1}{M}f \quad \cdots (6) \\[2mm] \dot{f} = Kv \end{bmatrix}$$

$$\Rightarrow \quad \begin{bmatrix} M & 0 \\ 0 & 1/K \end{bmatrix}\begin{bmatrix} \dot{v} \\ \dot{f} \end{bmatrix} = \begin{bmatrix} -(C+D) & -1 \\ 1 & 0 \end{bmatrix}\begin{bmatrix} v \\ f \end{bmatrix} + \begin{bmatrix} f_{in} \\ 0 \end{bmatrix} \quad \cdots (7)$$

$$\Rightarrow \quad \text{TRANSFER FUNCTION} \quad G = \left[ j\omega \begin{bmatrix} M & 0 \\ 0 & 1/K \end{bmatrix} + \begin{bmatrix} C+D & 1 \\ -1 & 0 \end{bmatrix} \right]^{T} \quad \cdots (8)$$

THREE-DIMENSIONAL STRUCTURE SPACECRAFT AND METHOD FOR CONTROLLING THREE-DIMENSIONAL STRUCTURE SPACECRAFT

CLAIM OF PRIORITY

The present application claims priority from Japanese Patent application serial No. 2024-072065, filed on Apr. 26, 2024, the content of which is hereby incorporated by reference into this application.

BACKGROUND

The present disclosure relates to a three-dimensional structure spacecraft and a method for controlling a three-dimensional structure spacecraft.

In the development of large structures for space, lightweight structures that can be stored and deployed are required from the perspective of reducing launch costs, and the application of tensegrity structures is expected. For example, the University of California is proceeding with research and development on a tensegrity robot for planetary exploration. This robot has a configuration that changes the spatial arrangement of a compression member by making the length of a tension member variable using an actuator for adjusting the length of the tension member, and this configuration enables the robot to move by changing the position of the center of gravity of the robot.

U.S. Patent Application Publication No. 2023-0050299 discloses a tensegrity robot that includes a plurality of compression members, a plurality of tension members, and a plurality of actuators and in which each of the actuators is attached to a respective one of the compression members and is capable of selectively changing the tension or length of a tension member.

SUMMARY

A spacecraft that has a tensegrity structure is lightweight and has high structural stability, but a vibration occurs throughout the spacecraft during ejection from a rocket, during posture control using a reaction wheel or the like, or when the spacecraft is subjected to air resistance, solar wind disturbance, or the like, as in a general spacecraft. A precise observation device and a precise measurement device or the like need to be installed in a spacecraft with a tensegrity structure, and it is necessary to suppress even a slight vibration in order to observe a natural phenomenon in space, a human activity on Earth, or the like.

In U.S. Patent Application Publication No. 2023-0050299, it is not clear how to suppress a vibration when the vibration occurs when the tensegrity robot moves or receives an external force, or the like.

An object of the present disclosure is to appropriately attenuate a vibration even when a three-dimensional structure spacecraft having a so-called tensegrity structure vibrates when the spacecraft is subjected to air resistance, solar wind disturbance, or the like, lands on a satellite or a planet and performs work, or the like.

A three-dimensional structure spacecraft according to the present disclosure includes a plurality of compression members and a plurality of tension members. Three or more of the tension members are connected to each of ends of the compression members. A three-dimensional shape formed by the compression members and the tension members is maintained by tension of the tension members. A variable damping force damper is disposed in at least either the compression members or the tension members. The variable damping force damper is configured to generate a predetermined force in a longitudinal direction of the compression members or in a longitudinal direction of the tension members.

According to the present disclosure, it is possible to appropriately attenuate a vibration even when a three-dimensional structure spacecraft having a so-called tensegrity structure vibrates when the spacecraft is subjected to air resistance, solar wind disturbance, or the like, lands on a satellite or a planet and performs work, or the like.

BRIEF DESCRIPTION OF THE DRAWINGS

FIG. 4 is a flowchart illustrating a process of suppressing a vibration of the three-dimensional structure spacecraft according to the first embodiment;

FIG. 14A is a physical function diagram based on a motion of the tensegrity structure illustrated in FIG. 12A;

FIG. 14B is a diagram illustrating a process of deriving a transfer characteristic (transfer function) of the tensegrity structure illustrated in FIG. 12A;

FIG. 15A is a physical function diagram based on a motion according to the first embodiment;

FIG. 15B is a diagram illustrating a process of deriving a transfer characteristic (transfer function) according to the first embodiment;

FIG. 18C is a physical function diagram according to the fourth embodiment;

FIG. 18D is a diagram illustrating a process of deriving a transfer characteristic (transfer function) according to the fourth embodiment;

DETAILED DESCRIPTION

Hereinafter, embodiments of the present disclosure will be described with reference to the drawings.

First Embodiment

Figure 1A:
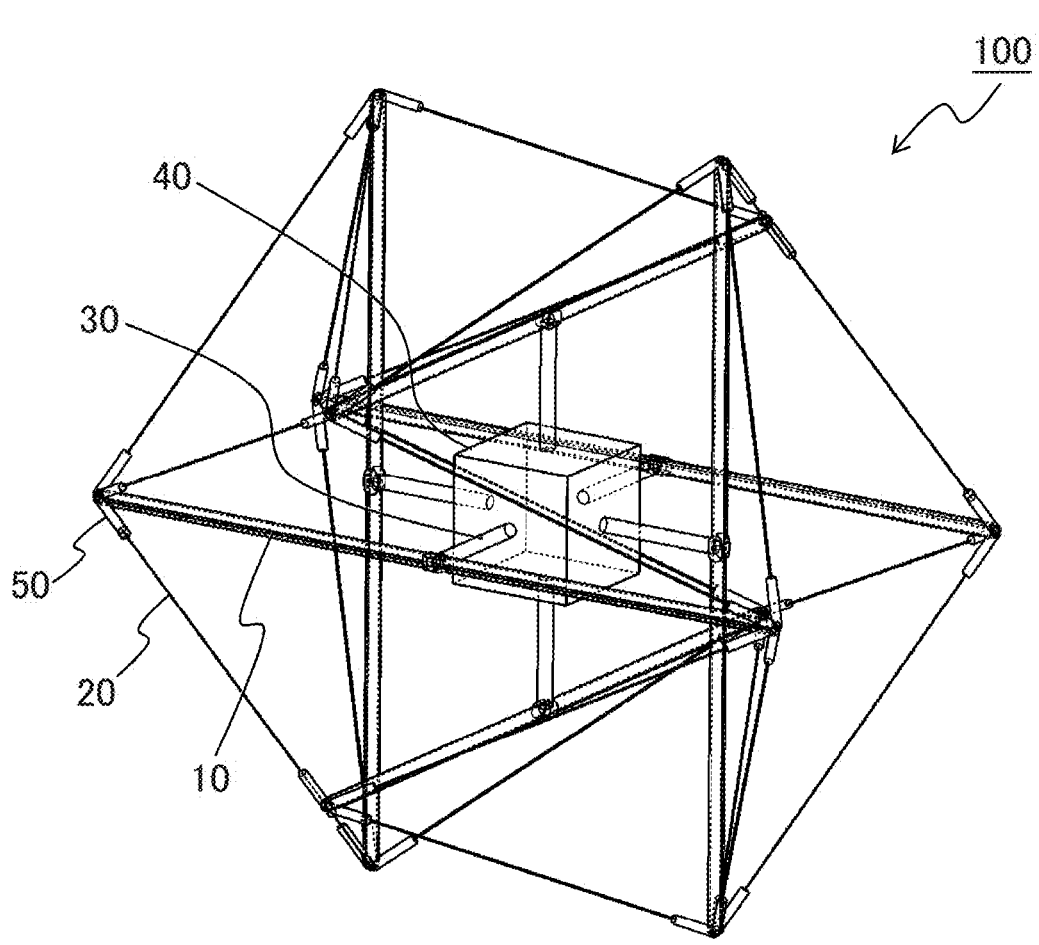
FIG. 1A is a perspective view illustrating a three-dimensional structure spacecraft according to a first embodiment.

FIG. 1A is a perspective view illustrating a three-dimensional structure spacecraft according to a first embodiment.

In FIG. 1A, the three-dimensional structure spacecraft 100 includes a plurality of compression members 10, a plurality of tension members 20, a plurality of poles 30, a housing 40, and a plurality of variable damping force dampers 50. The compression members 10 and the tension members 20 are main components and form a tensegrity structure. The tension members 20 are connected to each of ends of the compression members 10. Distances between the ends are maintained constant by the tension members 20. The poles 30 are connected to surfaces of the housing 40. Each of the poles 30 supports a different compression member 10 in the vicinity of the pole 30 among compression members 10.

The variable damping force dampers 50 are disposed at the ends of the compression members 10. In other words, the variable damping force dampers 50 are attached to both ends of each of the tension members 20, and both ends of each of the tension members 20 are connected to the compression members 10 via the variable damping force dampers 50. The tension members 20 are configured such that distances from the ends of the compression members 10 to the tension members 20 can be changed within a predetermined range by the variable damping force dampers 50.

Figure 1B:
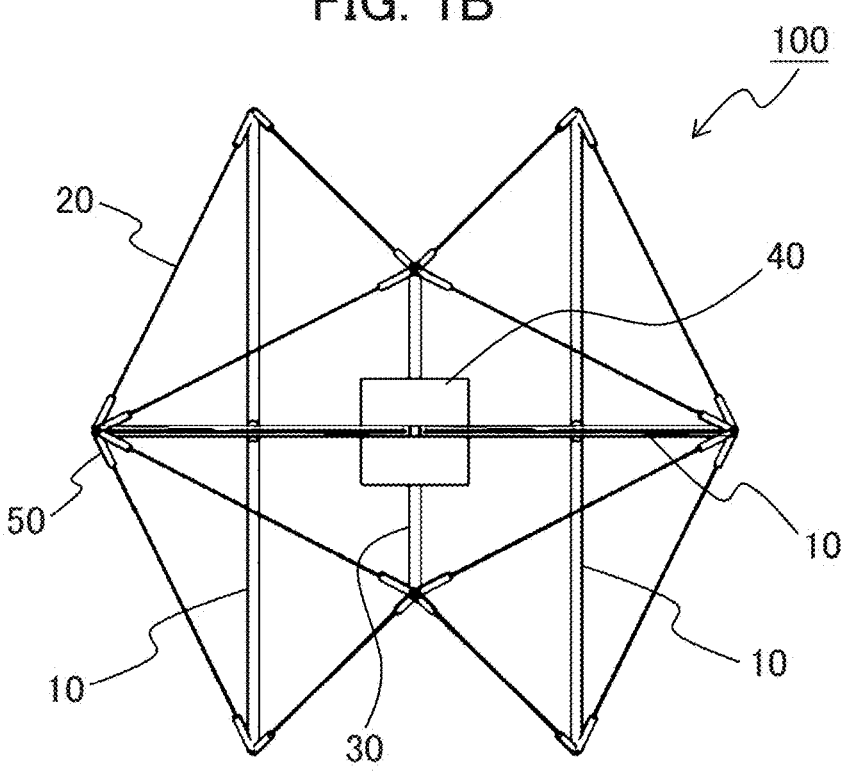
FIG. 1B is a front view illustrating the three-dimensional structure spacecraft illustrated in FIG. 1A.

FIG. 1B is a front view of the three-dimensional structure spacecraft illustrated in FIG. 1A.

As illustrated in FIG. 1B, the plurality of variable damping force dampers 50 are attached to the ends of the compression members 10 extending in a horizontal direction. One end of each of the tension members 20 is attached to each of the variable damping force dampers 50. The other end of each of the tension members 20 is attached to another one of the variable damping force dampers 50 attached to the compression members 10. Therefore, a distance between the ends of the two compression members 10 is kept constant. In addition, two of the compression members 10 are erected in a vertical direction.

Figure 1C:
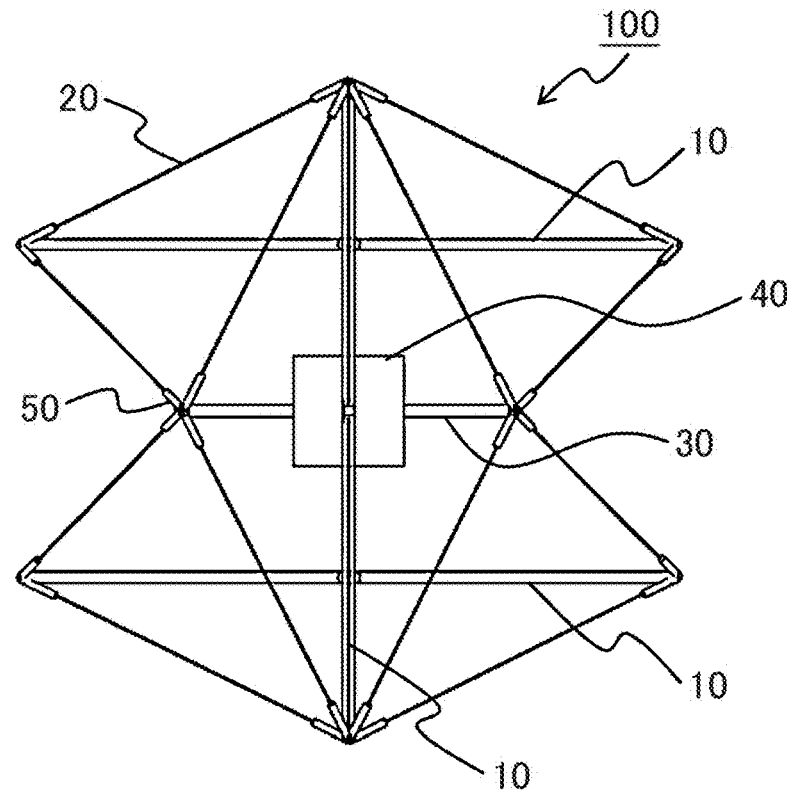
FIG. 1C is a side view illustrating the three-dimensional structure spacecraft illustrated in FIG. 1A.

FIG. 1C is a side view of the three-dimensional structure spacecraft illustrated in FIG. 1A.

As illustrated in FIG. 1C, the plurality of variable damping force dampers 50 are attached to the ends of the compression members 10 extending in the vertical direction.

The compression members 10 are formed of, for example, a component containing beryllium copper, carbon fiber reinforced plastics (CFRP), and a copper alloy. Since the compression members 10 are used as an expandable dipole antenna, it is desirable to use a material suitable for the compression members 10. The tension members 20 are formed of, for example, a thread (similar to monofilament for fishing) made of resin such as polyethylene, a wire rod of CFRP, stainless steel, or a copper alloy, a thin film of resin, CFRP, stainless steel, or a copper alloy, or the like. The poles 30 are made of, for example, beryllium copper, stainless steel, or the like.

In this manner, the three-dimensional structure spacecraft 100 is configured to maintain a predetermined shape by applying tension to the tension members 20 while the compression members 10 extending in the vertical direction and the compression members 10 extending in the horizontal direction do not contact each other.

Figure 2:
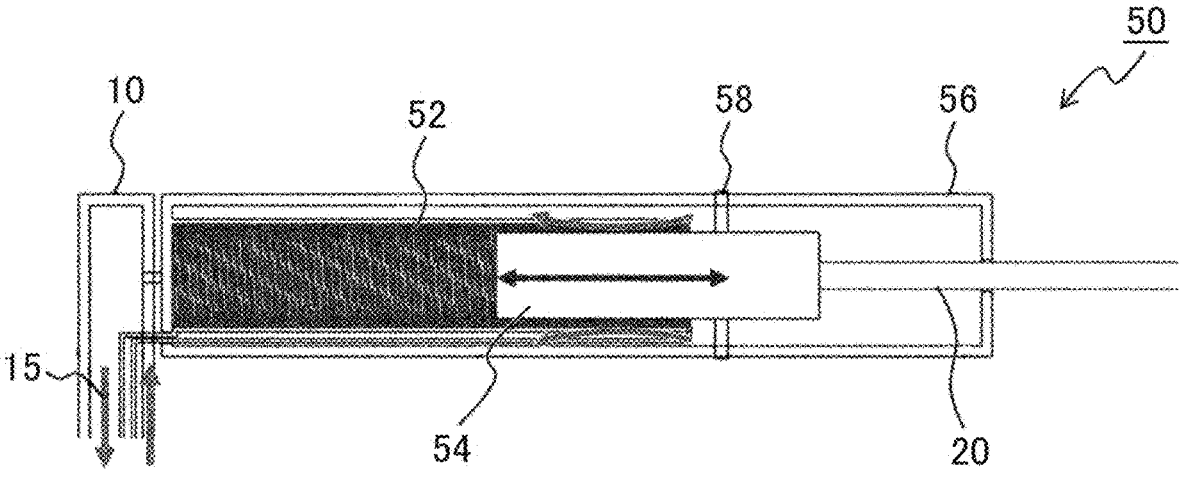
FIG. 2 is a cross-sectional view illustrating a variable damping force damper according to the first embodiment.

FIG. 2 is a cross-sectional view illustrating the variable damping force damper according to the present embodiment.

As illustrated in FIG. 2, each of the variable damping force dampers 50 includes a coil 52, an iron core 54, an outer cylinder 56, and a latch 58. The coil 52 and the iron core 54 are housed in the outer cylinder 56. The latch 58 is disposed inside the outer cylinder 56 and secures the iron core 54 at a predetermined position. An end of the tension member 20 is connected to the iron core 54. The outer cylinder 56 is secured to the compression member 10. The compression member 10 is provided with wiring for supplying a current 15 to the coil 52.

Figure 3:
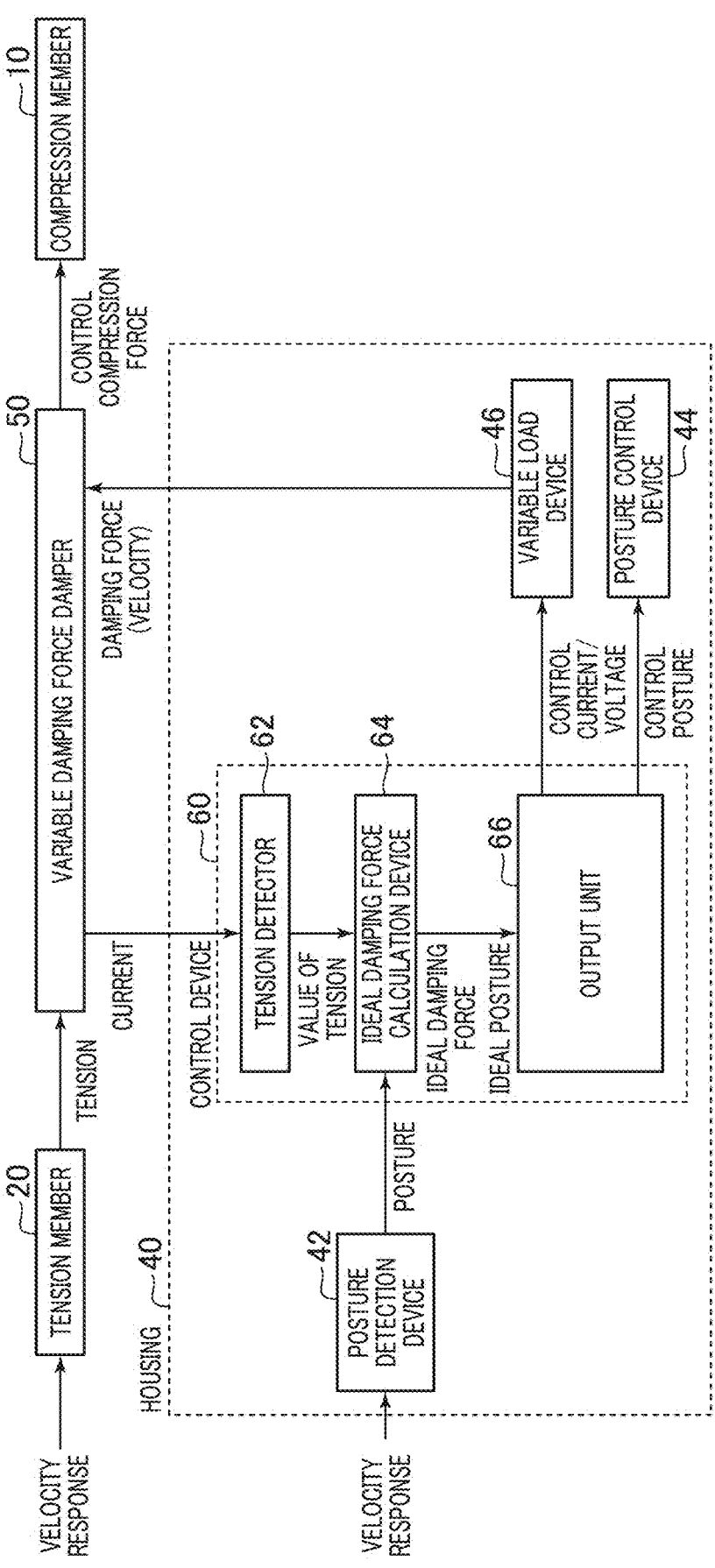
FIG. 3 is a block diagram of the three-dimensional structure spacecraft according to the first embodiment.

FIG. 3 is a block diagram of the three-dimensional structure spacecraft according to the present embodiment.

FIG. 3 illustrates the compression member 10, the tension member 20, the housing 40, and the variable damping force damper 50 that are included in the three-dimensional structure spacecraft. The housing 40 includes a control device 60 (control unit), a posture detection device 42 (posture detection unit), a posture control device 44 (posture control unit), and a variable load device 46 (variable load unit). The control device 60 includes a tension detector 62, an ideal damping force calculation device 64 (ideal damping force calculation unit), and an output unit 66.

When the three-dimensional structure spacecraft vibrates, the tension of the tension members 20 changes and the iron cores of the variable damping force dampers 50 move. By this movement, a current is generated in the coils of the variable damping force dampers 50. The tension detector 62 detects the current, calculates a value of the tension, and transmits the calculated value to the ideal damping force calculation device 64. In addition, the ideal damping force calculation device 64 receives data regarding the posture of the three-dimensional structure spacecraft from the posture detection device 42. The ideal damping force calculation device 64 calculates an ideal damping force and an ideal posture using the value of the tension and the data regarding the posture, and transmits data of the calculated ideal damping force and the calculated ideal posture to the output unit 66. In this case, the ideal damping force refers to an optimal damping force for controlling a change in the tension of the tension members 20 due to the vibration of the three-dimensional structure spacecraft. In addition, the ideal posture refers to a shape and an orientation of the three-dimensional structure spacecraft that are optimal for an operation to be performed by the three-dimensional structure spacecraft. To maintain this posture, the tension and the lengths of the tension members 20 are adjusted. Normally, the latches 58 are in an opened state, and the iron cores 54 are secured by using the latches 58 to fix the lengths of tension members 20.

The output unit 66 uses the data of the ideal damping force and the ideal posture to calculate at least one of a current and a voltage to be used to control the variable damping force dampers 50, and transmits the at least one of the current and the voltage to the variable load device 46. The variable load device 46 transmits data regarding a damping force (velocity) to the variable damping force dampers 50. In addition, the output unit 66 transmits data regarding the posture of the three-dimensional structure spacecraft to the posture control device 44. The variable damping force dampers 50 generate a compression force to be applied to the compression members 10, based on the data regarding the damping force (velocity) received from the variable load device 46. In addition, the variable damping force dampers 50 may change a current of the coils based on the data so as to adjust the tension of the tension members 20.

Strain gauges may be disposed on the tension members, and detect the tension of the tension members. In this case, the tension detector 62 receives a signal of a current or a voltage obtained by the strain gauges and calculates values of the tension.

FIG. 4 is a flowchart illustrating a process (control method) of suppressing a vibration of the three-dimensional structure spacecraft according to the present embodiment. FIG. 4 illustrates a case where the three-dimensional structure spacecraft is an artificial satellite.

When the artificial satellite vibrates due to disturbance (step S110), the tension members vibrate (slight expansion and contraction), and the tension of the tension members change due to the vibrations of the tension members (step S120). As the tension changes, the iron cores of the variable damping force dampers move an extremely short distance (step S130). Forces such as gravity force and centrifugal force that act on the iron cores are smaller than the tension. In the variable damping force dampers, an electromagnetic-induced electromotive force is generated in the coils by the movement of the iron cores, and a current flows in the coils due to the generation of the electromagnetic-induced electromotive force (step S140). The current flowing in the coils is transmitted to the control device inside the housing through wiring provided in the compression members and the poles. Thereafter, the control device detects the current and calculates a damping force corresponding to the tension or to a change in the tension (step S150). Then, the output unit included in the control device is used to adjust the variable load (damping force) (step S160). That is, a current that generates an electromagnetic force corresponding to the calculated damping force is caused to flow in the coils of the variable damping force dampers such that the electromagnetic force acting on the iron cores is adjusted.

Although the present specification describes the case where the damping force that suppresses vibrations of the compression members or the tension members of the three-dimensional structure spacecraft is an electromagnetic force that acts between the coils and the iron cores, a configuration for generating a force such as the damping force in the three-dimensional structure spacecraft according to the present disclosure is not limited thereto. In addition to the damping force, a force such as the electromagnetic force may be adjusted, for example, in order to maintain the shape, posture, and the like of the whole three-dimensional structure spacecraft. Therefore, in the present specification, the forces such as the damping force may be collectively referred to a "predetermined force".

In a method for controlling the three-dimensional structure spacecraft, the control device detects a change in a current or a voltage in the variable damping force dampers, calculates a damping force that is a predetermined force for controlling a vibration, and applies, to the variable damping force dampers, a current or a voltage corresponding to the damping force. Furthermore, the control device determines whether the change in the current or the voltage has been reduced.

Next, the control device determines, based on the change in the current or the voltage, whether vibrations of the tension members have attenuated (step S170). In a case where the vibrations have sufficiently attenuated, the latches may be used to secure the iron cores and fix the positions of the ends of the tension members (step S180). In other words, it is possible to fix the lengths of portions which are included in the tension members and are exposed from the outer cylinders of the variable damping force dampers. On the other hand, in a case where the vibrations have not sufficiently attenuated, the process returns to S160 and the variable load is adjusted.

It is possible to appropriately attenuate the vibrations by the above-described steps even when the artificial satellite vibrates due to disturbance. Therefore, it is possible to maintain the shape, the orbit, and the like of the artificial satellite and prevent breakage and the like of the components of the artificial satellite.

When the spacecraft lands on a satellite such as the moon or a planet such as Mars, performs work, and vibrates due to the movement, collision, or the like of the spacecraft, the spacecraft can attenuate the vibration, maintain the shape of the spacecraft, and continue the movement, the work, and the like. In addition, it is possible to prevent breakage and the like of the components of the spacecraft.

Second Embodiment

A second embodiment describes only features different from those in the first embodiment.

Figure 5:
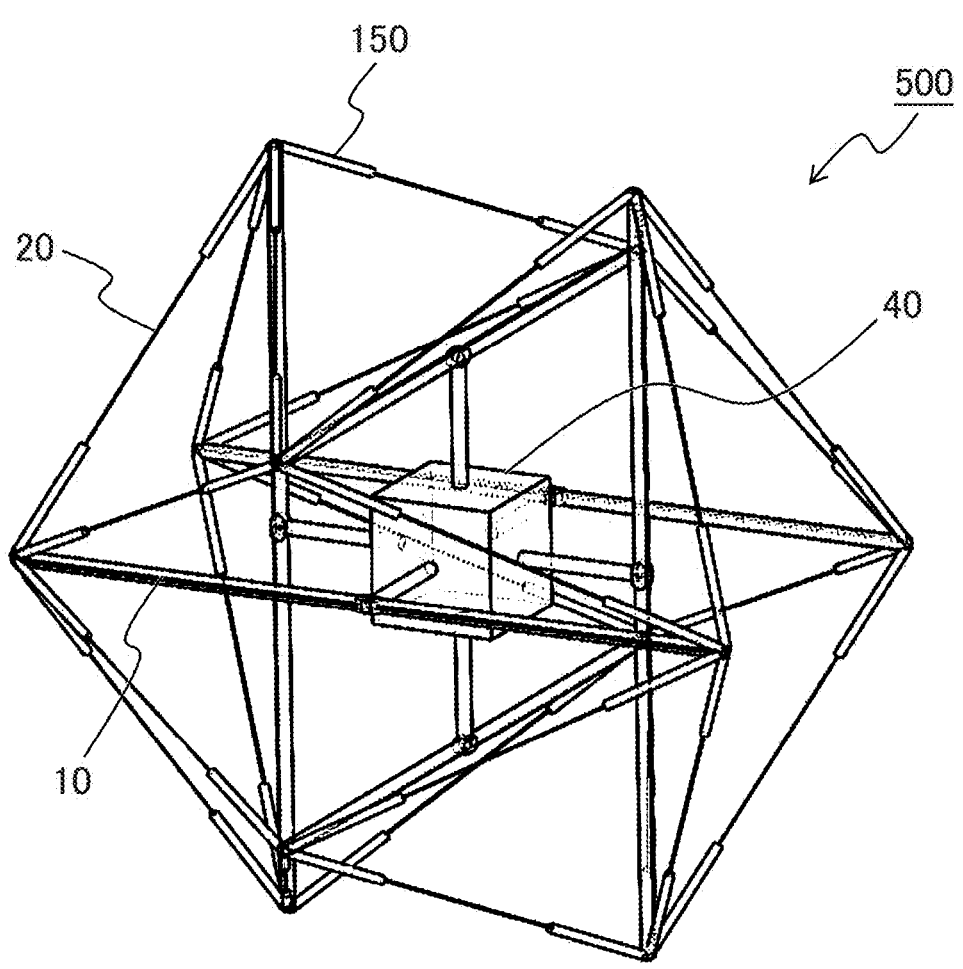
FIG. 5 is a perspective view illustrating a three-dimensional structure spacecraft according to a second embodiment.

FIG. 5 is a perspective view illustrating a three-dimensional structure spacecraft according to the second embodiment.

In the three-dimensional structure spacecraft illustrated in FIG. 5, lengths of variable damping force dampers 150 are longer than the lengths of the variable damping force dampers according to the first embodiment.

Figure 6:
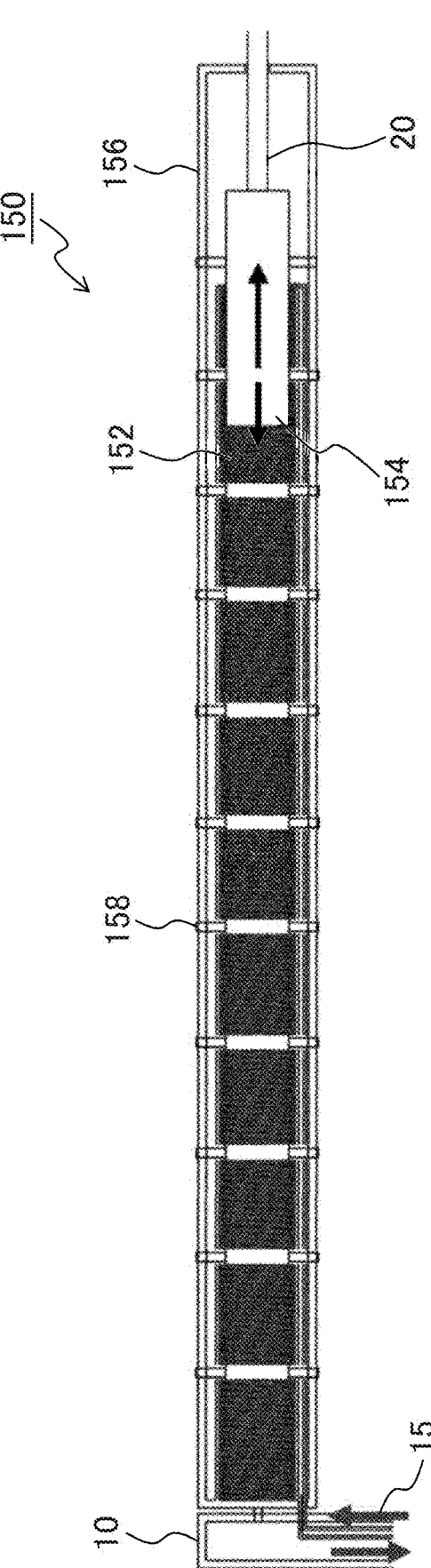
FIG. 6 is a cross-sectional view illustrating a variable damping force damper according to the second embodiment.

FIG. 6 is a cross-sectional view illustrating the variable damping force damper according to the second embodiment.

As illustrated in FIG. 6, each of the variable damping force dampers 150 includes a coil 152, an iron core 154, an outer cylinder 156, and latches 158. The plurality of latches 158 are disposed at equal intervals inside the outer cylinder 156. The coil 152 is disposed between the adjacent latches 158. The coil 152 may be divided and disposed. The total length of the coil 152 is longer than that in the first embodiment. That is, the total length of the variable damping force damper 150 is longer than that in the first embodiment. The iron core 154 can be secured at a predetermined position by any one of the plurality of latches 158. The outer cylinder 156 is secured to a compression member 10. The compression member 10 is provided with wiring for supplying a current 15 to the coil 152.

According to the present embodiment, it is possible to increase a range in which the icon core 154 can move. In addition, it is possible to increase a length of a portion which is included in tension member 20 and can be housed in the outer cylinder 156, and increase a range in which lengths of sides of the three-dimensional structure spacecraft 500 formed by the tension members 20 are adjusted. Therefore, it is possible to increase a range in which the shape of the three-dimensional structure spacecraft 500 can be adjusted. In addition, it is possible to increase a range in which a damping force is adjusted.

Third Embodiment

A third embodiment describes only features different from those in the first embodiment.

Figure 7:
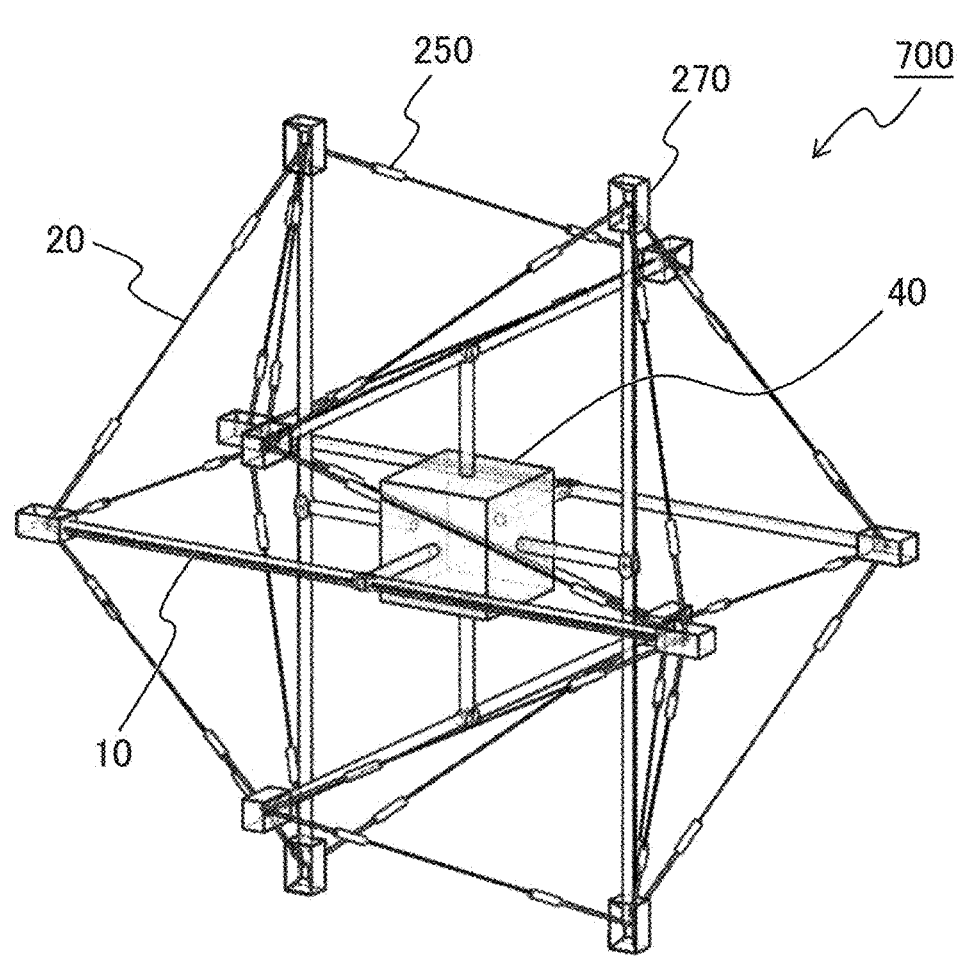
FIG. 7 is a perspective view illustrating a three-dimensional structure spacecraft according to a third embodiment.

FIG. 7 is a perspective view illustrating a three-dimensional structure spacecraft according to the third embodiment.

In FIG. 7, variable damping force dampers 250 of the three-dimensional structure spacecraft 700 are disposed not at ends of tension members 20 but near the centers of the tension members 20. Tension member length control devices 270 (tension member length control unit) are disposed at ends of compression members 10.

Figure 8:
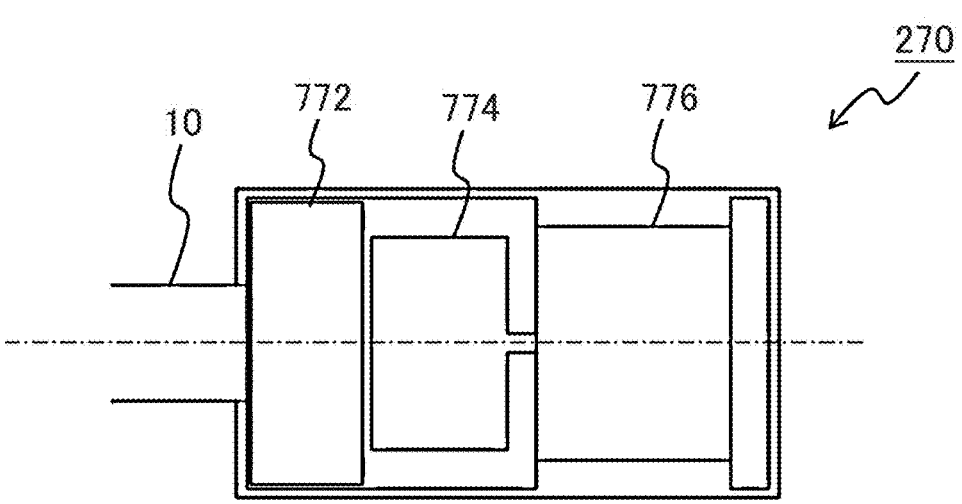
FIG. 8 is a cross-sectional view illustrating a tension member length control device according to the third embodiment.

FIG. 8 is a cross-sectional view illustrating the tension member length control device according to the present embodiment.

As illustrated in FIG. 8, each of the tension member length control devices 270 includes a controller 772, a motor 774, and a tension member winding unit 776. The tension member length control device 270 is attached to the end of the compression member 10. The tension member connected to the tension member winding unit 776 can adjust a length of an exposed portion by rotation of the motor 774.

Figure 9:
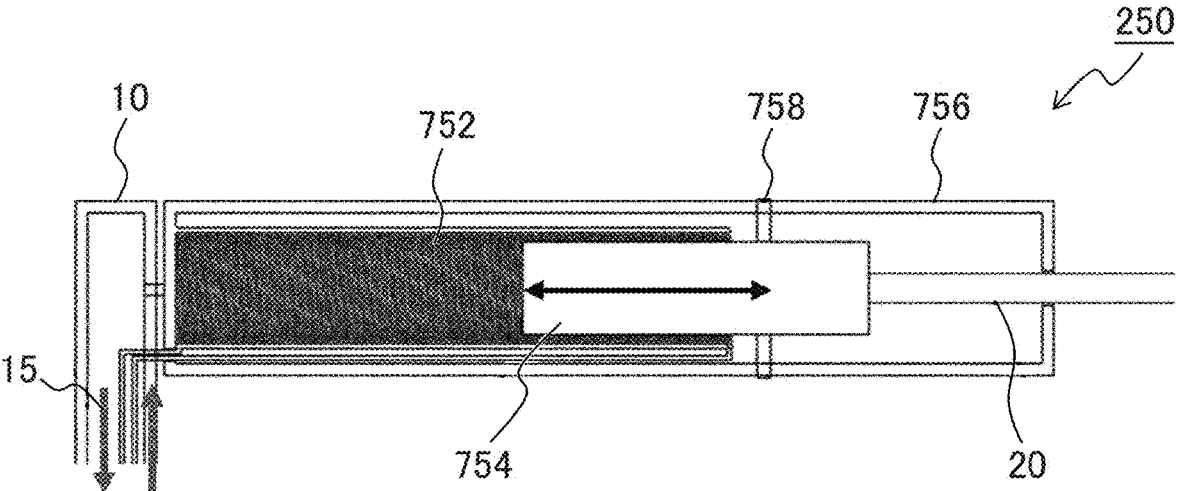
FIG. 9 is a cross-sectional view illustrating a variable damping force damper according to the third embodiment.

FIG. 9 is a cross-sectional view illustrating the variable damping force damper according to the present embodiment.

As illustrated in FIG. 9, each of the variable damping force dampers 250 includes a coil 752, an iron core 754, an outer cylinder 756, and a latch 758. The coil 752 and the iron core 754 are housed in the outer cylinder 756. The latch 758 is disposed inside the outer cylinder 756 and secures the iron core 754 at a predetermined position. An end of the tension member 20 is connected to the iron core 754. The outer cylinder 756 is secured to a damper support portion of the tension member winding unit 776 disposed at the end of the compression member 10. The compression member 10 is provided with wiring for supplying a current 15 to the coil 752.

According to the present embodiment, it is possible to adjust an effective length of each tension member 20.

Fourth Embodiment

A fourth embodiment describes only features different from those in the first embodiment.

Figure 10:
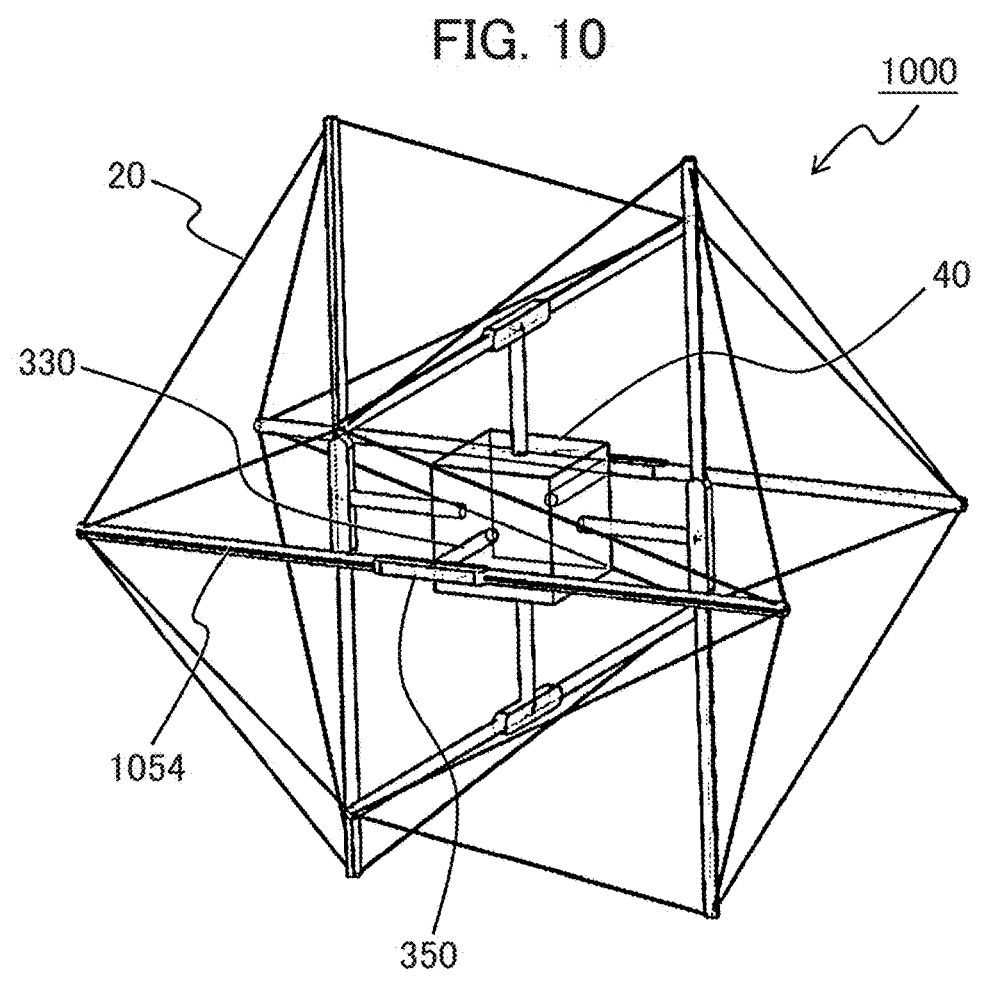
FIG. 10 is a perspective view illustrating a three-dimensional structure spacecraft according to a fourth embodiment.

FIG. 10 is a perspective view illustrating a three-dimensional structure spacecraft according to the present embodiment.

In FIG. 10, variable damping force dampers 350 of the three-dimensional structure spacecraft 1000 are supported by poles 330 disposed in a housing 40. Each of the variable damping force dampers 350 is disposed between iron core compression members 1054 that are two compression members disposed in series. One ends of the iron core compression members 1054 are connected to both ends of each of the variable damping force damper 350. Ends of tension members 20 are connected to the other exposed ends of the iron core compression members 1054.

Figure 11:
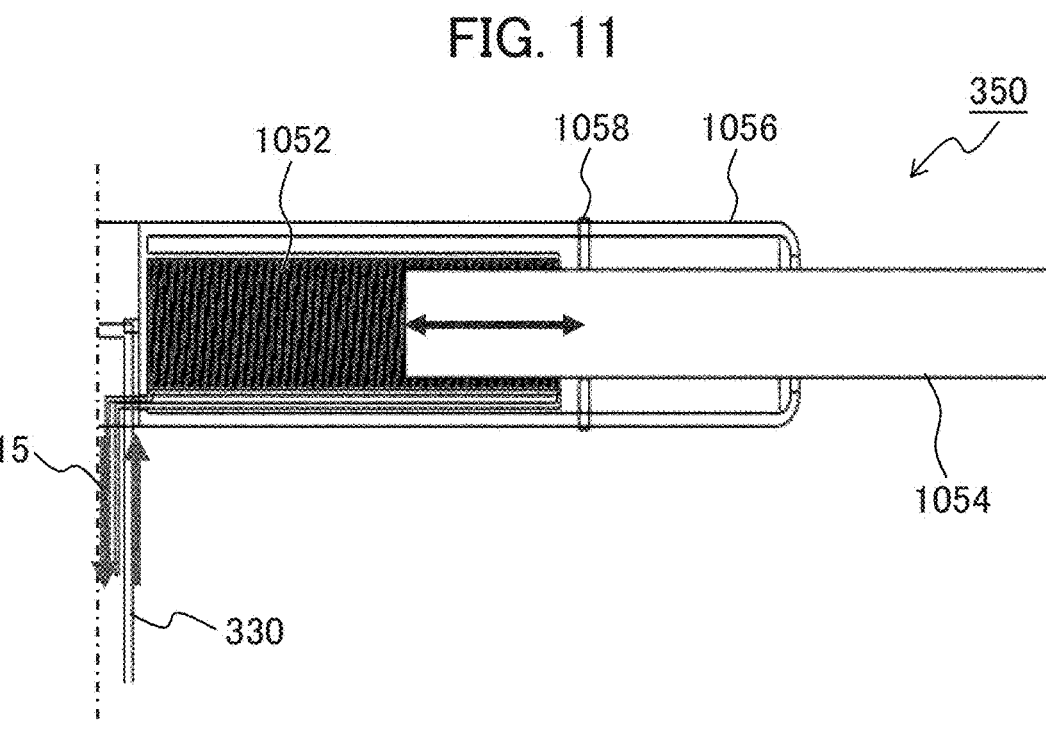
FIG. 11 is a partially cross-sectional view illustrating a variable damping force damper according to the fourth embodiment.

FIG. 11 is a partially cross-sectional view illustrating the variable damping force damper according to the present embodiment.

FIG. 11 illustrates a right-side portion of the variable damping force damper 350. Each of the variable damping force dampers 350 includes a coil 1052, an iron core compression member 1054, an outer cylinder 1056, and a latch 1058. The coil 1052 and one end of the iron core compression member 1054 are housed in the outer cylinder 1056. The latch 1058 is disposed inside the outer cylinder 1056 and secures the iron core compression member 1054 at a predetermined position. The pole 330 is provided with wiring for supplying a current 15 to the coil 1052.

When the spacecraft vibrates due to disturbance, the iron core compression member 1054 moves an extremely short distance. In the variable damping force damper 350, an electromagnetic-induced electromotive force is generated in the coil 1052 due to the movement of the iron core compression member 1054, and the current 15 flows in the coil 1052 due to the generation of the electromagnetic-induced electromotive force. The current 15 flowing in the coil 1052 is transmitted to the control device inside the housing 40 through the wiring provided in the pole 330. Then, the control device detects the current 15 and calculates a damping force according to a force acting on the iron core compression member 1054. The output unit included in the control device is used to adjust the variable load (damping force).

Therefore, even in the present embodiment, it is possible to adjust the damping force in a similar manner to the process of suppressing a vibration of the three-dimensional structure spacecraft as illustrated in FIG. 4 (the first embodiment).

In this manner, the variable damping force damper 350 may be disposed at a portion other than the end of the compression member 10 or the end of the tension member 20.

According to the present embodiment, it is possible to adjust lengths of sides of the three-dimensional structure spacecraft 1000 not on the tension member 20 side but on the iron core compression member 1054 side.

Next, an example of value calculation performed by converting the structure of the three-dimensional structure spacecraft according to the present embodiment into a mechanical model will be described.

Example of Value Calculation Using Mechanical Model

First, an example of a tensegrity structure will be described.

Figure 12A:
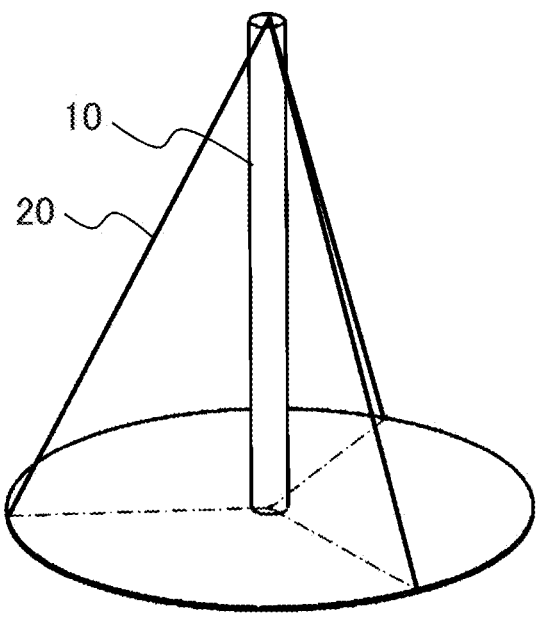
FIG. 12A is a schematic perspective view illustrating an example of a tensegrity structure.

FIG. 12A is a schematic perspective view illustrating a configuration that includes the compression member and the tension members for an example of the tensegrity structure.

FIG. 12A illustrates a three-dimensional model that includes the compression member 10 and the tension members 20 and does not include the variable damping force damper. The compression member 10 is arranged extending in the vertical direction in FIG. 12A. The three tension members 20 are attached to one end of the compression member 10.

Figure 12B:
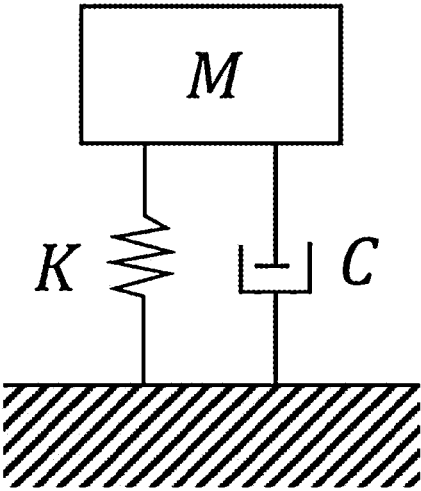
FIG. 12B is a mechanical model diagram of the tensegrity structure illustrated in FIG. 12A.

FIG. 12B is a mechanical model diagram of the tensegrity structure illustrated in FIG. 12A.

In FIG. 12B, a spring K and a damper C are connected in parallel to a mass point M. FIG. 12B illustrates a mechanical model corresponding to FIG. 12A.

Figures 12C, 12D:
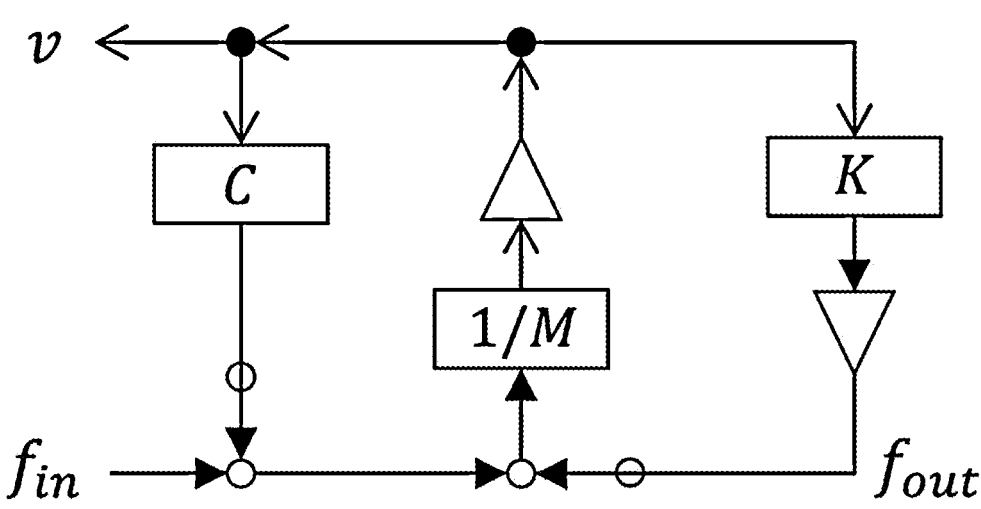
FIG. 12C is a physical function diagram of the tensegrity structure illustrated in FIG. 12A.
FIG. 12D is a table illustrating definitions of symbols used in the physical function diagram.

FIG. 12C is a physical function diagram of the tensegrity structure illustrated in FIG. 12A.

In FIG. 12C, a function for estimating values of a velocity v of the mass point M and a damping force $f_{out}$ when an external force fin is applied to the mass point M of the mechanical model illustrated in FIG. 12B is diagrammed.

K corresponds to a spring force proportional to a change in the length of the tension member, and C corresponds to the damping force $f_{out}$ proportional to a change in the length of the tension member over time. Appropriate initial tension is applied to the tension member in an equilibrium state, and conditions are set so that no slack occurs in the tension member. The damping force $f_{out}$ is generated based on the velocity v of the mass point M.

FIG. 12D is a table illustrating definitions of symbols used in the physical function diagram.

In FIG. 12D, the symbols used in the physical function diagram correspond to multiplication, addition, branching (equal sign), positive/negative inversion, and integration.

Next, the first embodiment will be described.

Figure 13A:
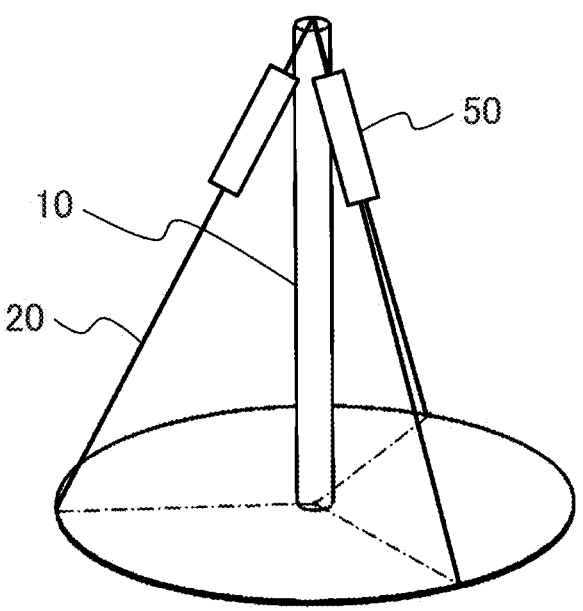
FIG. 13A is a schematic perspective view illustrating a configuration of a compression member, tension members, and variable damping force dampers according to the first embodiment.

FIG. 13A is a schematic perspective view illustrating a configuration of the compression member, the tension members, and the variable damping force dampers according to the first embodiment.

FIG. 13A illustrates a three-dimensional model having the compression member 10, the tension members 20, and the variable damping force dampers 50. The arrangement of the compression member 10 and the tension members 20 is identical or similar to the tensegrity structure illustrated in FIG. 12A. The variable damping force dampers 50 are attached to ends of the tension members 20.

Figure 13B:
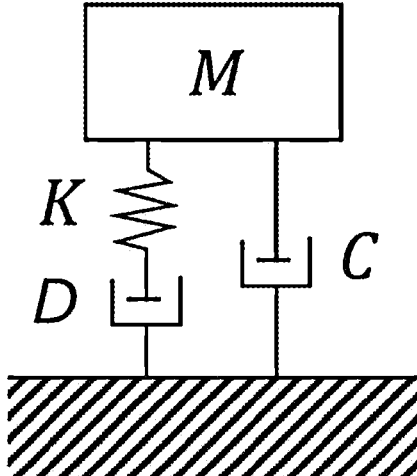
FIG. 13B is a mechanical model diagram according to the first embodiment.

FIG. 13B is a mechanical model diagram according to the first embodiment.

FIG. 13B illustrates a configuration in which the spring K is connected to a damper D (based on the variable damping force damper 50) in series in addition to the configuration of the tensegrity structure illustrated in FIG. 12B. FIG. 13B is a mechanical model corresponding to FIG. 13A.

Figure 13C:
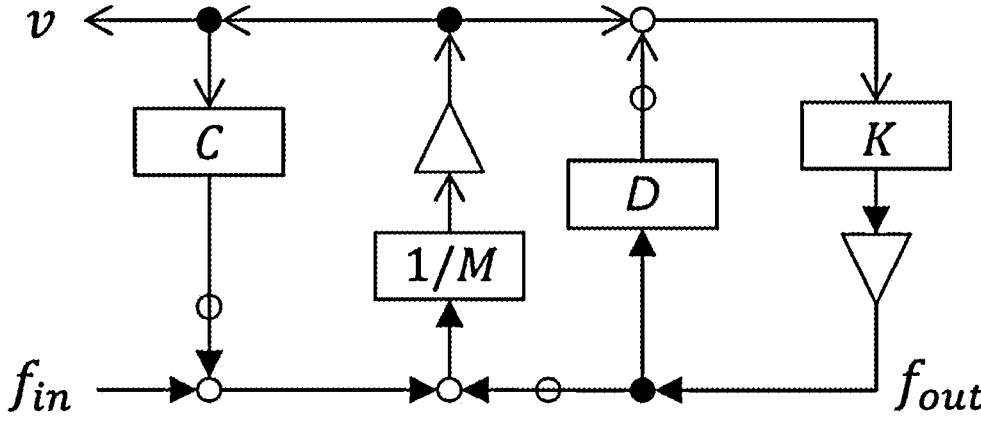
FIG. 13C is a physical function diagram according to the first embodiment.

FIG. 13C is a physical function diagram according to the first embodiment.

FIG. 13C illustrates a configuration in which the damper D is added to the configuration of the tensegrity structure illustrated in FIG. 12C. The damping force of the damper D is generated based on tension of the tension member.

FIG. 14A is a physical function diagram based on a motion of the tensegrity structure illustrated in FIG. 12A.

FIG. 14A is the same physical function diagram as that in FIG. 12C, except that functions including differentiation and integration are used.

FIG. 14A illustrates a time derivative of a velocity v (v dot) and a time derivative of a force f (f dot).

FIG. 14B is a diagram illustrating a process of deriving a transfer characteristic (transfer function) of the tensegrity structure illustrated in FIG. 12A.

In FIG. 14B, Equation (1) represents the configuration illustrated in FIG. 14A using a simultaneous differential equation. Equation (2) is a matrix representation of Equation (1). Equation (3) represents a transfer function G obtained by transforming Equation (2).

FIG. 15A is a physical function diagram based on a motion according to the first embodiment.

FIG. 15A is a diagram in which functions including differentiation and integration are used as in FIG. 14A.

FIG. 15B is a diagram illustrating a process of deriving a transfer characteristic (transfer function) according to the first embodiment.

In FIG. 15B, Equation (4) is a simultaneous differential equation represented by matrixes. Equation (5) is a transfer function G obtained by transforming Equation (4).

Figure 16A:
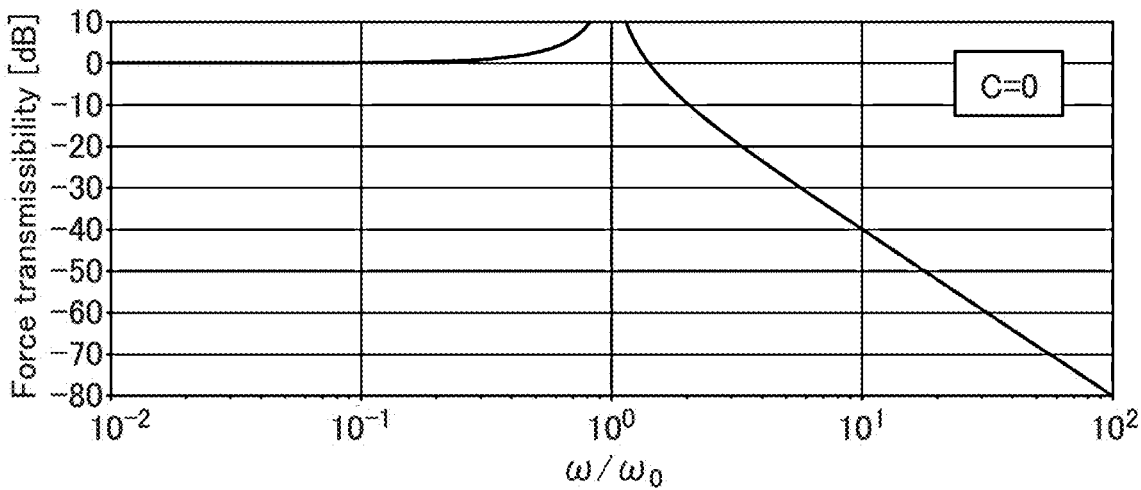
FIG. 16A is a graph illustrating a transfer characteristic in a mechanical model of the tensegrity structure illustrated in FIG. 12A.

FIG. 16A is a graph illustrating a transfer characteristic in the mechanical model of the tensegrity structure illustrated in FIG. 12A. The horizontal axis represents a normalized frequency $\omega/\omega_0$, and the vertical axis represents force transmissibility.

In FIG. 16A, C=0, which is a condition in which the damping force does not act. Therefore, in a case where w is equal to a resonance frequency $\omega_0$, that is, in a case where $\omega/\omega_0=1$, the force transmissibility is infinite and diverges.

Figure 16B:
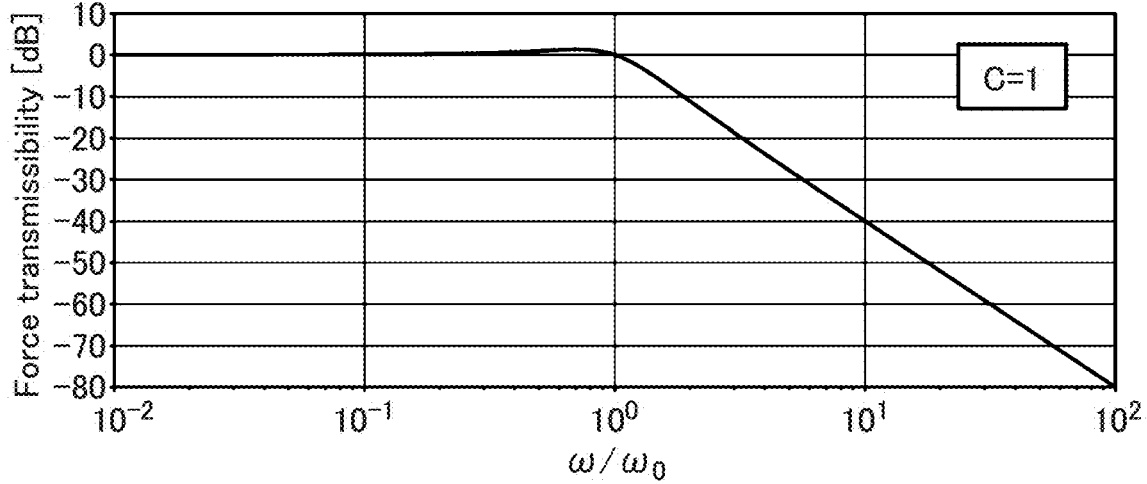
FIG. 16B is a graph illustrating a transfer characteristic in the mechanical model of the tensegrity structure illustrated in FIG. 12A.

FIG. 16B is a graph illustrating a transfer characteristic in the mechanical model of the tensegrity structure illustrated in FIG. 12A.

In FIG. 16B, C=1, which is a condition in which the damping force acts. Therefore, even in a case where w is equal to the resonance frequency $\omega_0$, the force transmissibility does not diverse and is a predetermined value.

Figure 17A:
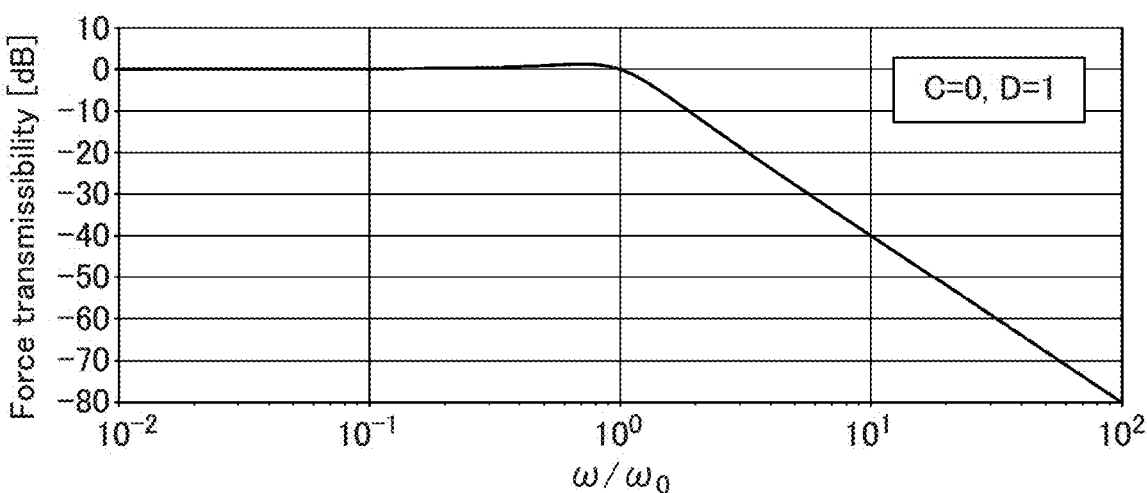
FIG. 17A is a graph illustrating a transfer characteristic in a mechanical model according to the first embodiment.

FIG. 17A is a graph illustrating a transfer characteristic in the mechanical model according to the first embodiment.

In FIG. 17A, C=0 and D=1, which are conditions in which the damping force by the variable damping force damper disposed at the tension member acts. Therefore, even in a case where w is equal to the resonance frequency $\omega_0$, the force transmissibility does not diverse and is a predetermined value.

Figure 17B:
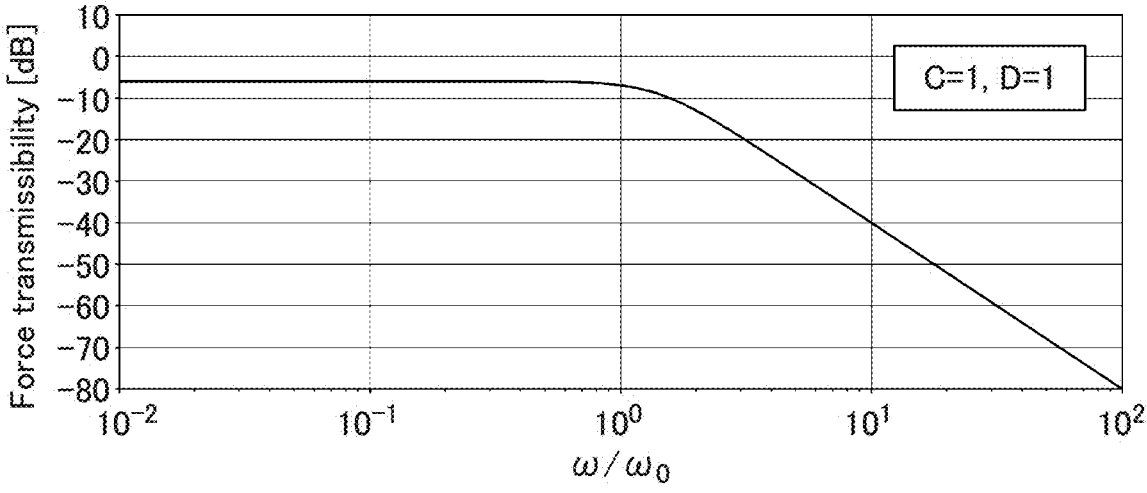
FIG. 17B is a graph illustrating a transfer characteristic in the mechanical model according to the first embodiment.

FIG. 17B is a graph illustrating a transfer characteristic in the mechanical model according to the first embodiment.

In FIG. 17B, C=1 and D=1, which are conditions in which two damping forces act. Therefore, even in a case where w is equal to the resonance frequency $\omega_0$, the force transmissibility does not diverse and is a predetermined value. In addition, the force transmissibility is a negative value (less than or equal to −6 dB) for all frequencies. Therefore, even in a low frequency range ($\omega/\omega_0, \leq 1$), it is possible to control the damping forces and suppress a vibration.

Next, the fourth embodiment will be described.

Figure 18A:
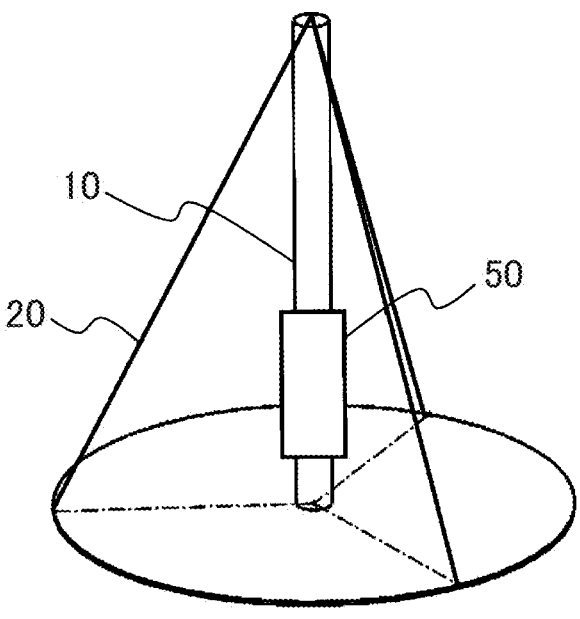
FIG. 18A is a schematic perspective view illustrating a configuration of a compression member, tension members, and a variable damping force damper according to the fourth embodiment.

FIG. 18A is a schematic perspective view illustrating the arrangement of the compression member and the tension members according to the fourth embodiment.

FIG. 18A illustrates a three-dimensional model having the compression member 10, the tension members 20, and the variable damping force dampers 50. The arrangement of the compression member 10 and the tension members 20 is identical or similar to the tensegrity structure illustrated in FIG. 12A. The variable damping force damper 50 is attached to the compression member 10.

Figure 18B:
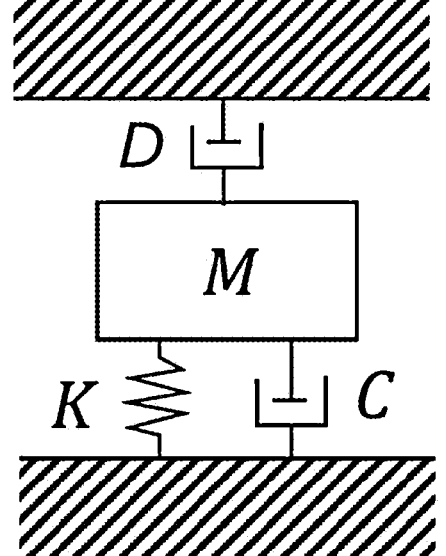
FIG. 18B is a mechanical model diagram according to the fourth embodiment.

FIG. 18B is a mechanical model diagram according to the fourth embodiment.

FIG. 18B illustrates a configuration in which the damper D (based on the variable damping force damper 50) is connected in series to the mass point M in the configuration of the tensegrity structure illustrated in FIG. 12B, in which the spring K and the damper C are connected in parallel to the mass point M. FIG. 18B illustrates a mechanical model corresponding to FIG. 18A.

FIG. 18C is a physical function diagram according to the fourth embodiment.

FIG. 18C illustrates a configuration in which a damper C' is provided instead of the damper C that is a component according to the comparative example illustrated in FIG. 12C. In this case, C' represents a configuration in which the damper C and the damper D are connected to each other in series, and C'=C+D. The damping force of the damper D is generated based on tension of the tension member.

FIG. 18D is a diagram illustrating a process of deriving a transfer characteristic (transfer function) according to the fourth embodiment.

In FIG. 18D, Equation (6) represents the configuration illustrated in FIG. 18C using a simultaneous differential equation. Equation (7) is a matrix representation of Equation (6). Equation (8) represents a transfer function G obtained by transforming Equation (7).

Figure 19A:
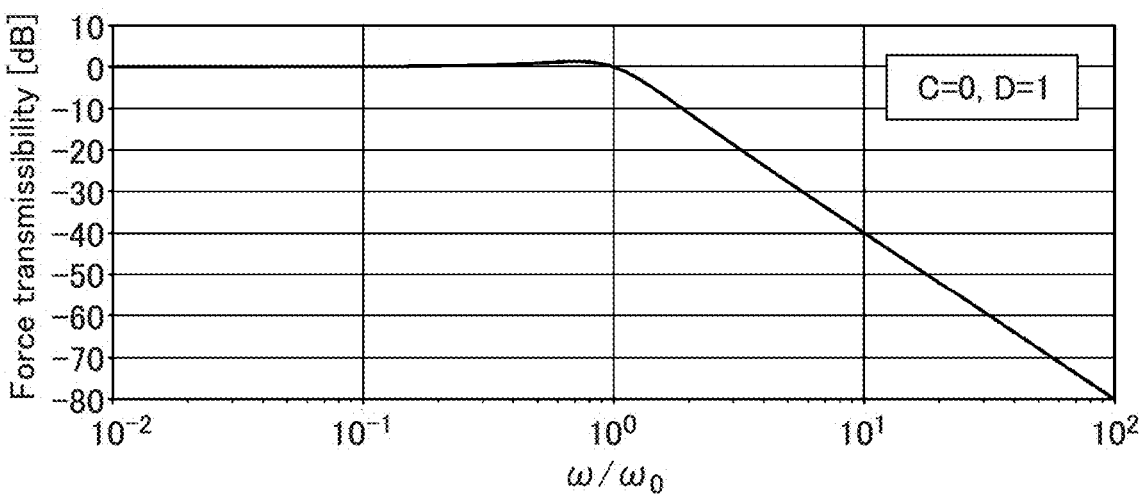
FIG. 19A is a graph illustrating a transfer characteristic in a mechanical model according to the fourth embodiment.

FIG. 19A is a graph illustrating a transfer characteristic in the mechanical model according to the fourth embodiment.

In FIG. 19A, C=0 and D=1, which are conditions in which the damping force by the variable damping force damper disposed at the compression member acts. Therefore, even in a case where w is equal to the resonance frequency $\omega_0$, the force transmissibility does not diverse and is a predetermined value.

Figure 19B:
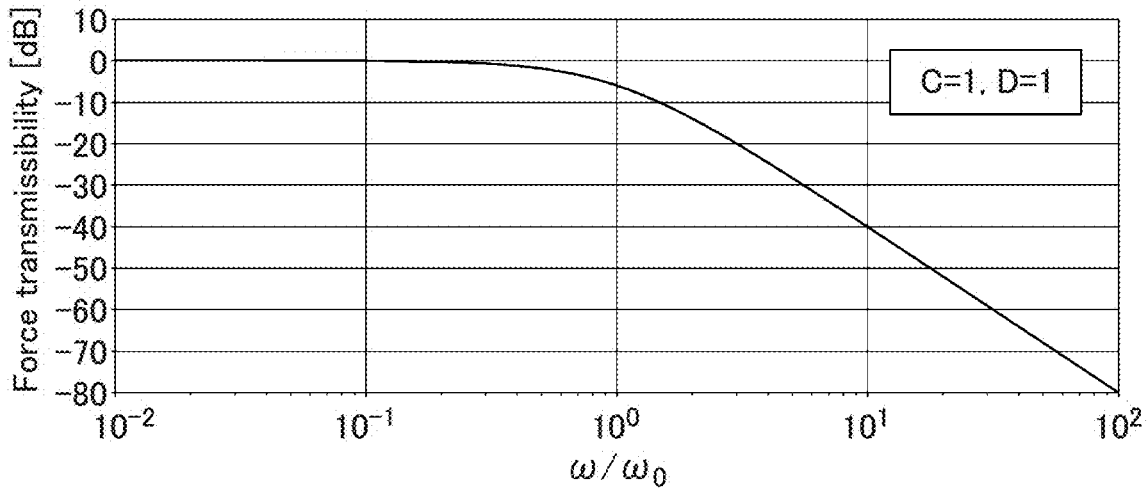
FIG. 19B is a graph illustrating a transfer characteristic in the mechanical model according to the fourth embodiment.

FIG. 19B is a graph illustrating a transfer characteristic in the mechanical model according to the fourth embodiment.

In FIG. 19B, C=1 and D=1, which are conditions in which two damping forces act. Therefore, even in a case where w is equal to the resonance frequency $\omega_0$, the force transmissibility does not diverse and is a negative value (less than or equal to −6 dB). In addition, the force transmissibility is less than or equal to 0 dB for all the frequencies. Therefore, even in a low frequency range ($\omega/\omega_0$, ≤ 1), it is possible to control the damping forces and suppress a vibration.

The preferable embodiments of the three-dimensional structure spacecraft according to the present disclosure will be summarized below.

The compression members have a structure that can be folded by loosening the tension members and unfolded to the original three-dimensional structure by tensioning the tension members.

It is preferable that the compression members be formed of dielectrics. The compression members function as an observing device (for example, an antenna).

In a case where a thin film is used as each of the tension members, an array antenna and a solar panel are attached to a surface of the thin film.

Each of the variable damping force dampers may be, for example, an electromagnetic shunt damper, a ball screw type electromagnetic damper, a magnetic fluid damper, a piezoelectric damper, or the like.

It is preferable that each of the latches be a mechanical tension relief prevention stopper.

It is preferable that the compression members and the tension members be symmetrically arranged to increase the stability of the structure.

The damping force of each of the variable damping force dampers can be changed over time.

The damping force of each of the variable damping force dampers is changed by using the variable load unit to change a resistance value, for example.

The energy of a vibration that occurred in the variable damping force dampers may be converted into electric power and stored in a secondary battery.

What is claimed is:

1. A three-dimensional structure spacecraft comprising:
a plurality of compression members;
a plurality of tension members, wherein
    three or more of the tension members of the plurality of tension members are connected to each end of the compression members,
    a three-dimensional shape formed by the compression members and the tension members is maintained by tension of the tension members,
    a variable damping force damper is disposed in at least the compression members or the tension members, and
    the variable damping force damper is configured to generate a predetermined force in a longitudinal direction of the compression members or in a longitudinal direction of the tension members;
a housing; and
a pole disposed in the housing,
wherein the variable damping force damper is disposed between two compression members of the plurality of tension members disposed in series and is connected to the pole.

2. The three-dimensional structure spacecraft according to claim 1, wherein
the predetermined force includes a damping force that suppresses vibrations of the compression members or vibrations of the tension members.

3. The three-dimensional structure spacecraft according to claim 1, wherein
the variable damping force damper is disposed at the ends of the compression members or at ends of the tension members.

4. The three-dimensional structure spacecraft according to claim 1, wherein
the variable damping force damper is disposed at a distance from the ends of the compression members or ends of the tension members.

5. The three-dimensional structure spacecraft according to claim 1, further comprising:
a tension member length control unit that adjusts lengths of exposed portions of the tension members.

6. The three-dimensional structure spacecraft according to claim 1, wherein
each of the compression members is formed of a component containing beryllium copper, carbon fiber reinforced plastics, and a copper alloy.

7. The three-dimensional structure spacecraft according to claim 1, wherein each of the tension members comprises resin and a wire rod, the wire rod comprising:
carbon fiber reinforced plastics;
stainless steel; or,
a copper alloy.

8. The three-dimensional structure spacecraft according to claim 1, wherein
the pole is formed of beryllium copper or stainless steel.

9. A three-dimensional structure spacecraft comprising:
a plurality of compression members;
a plurality of tension members, wherein
    three or more of the tension members of the plurality of tension members are connected to each end of the compression members, a three-dimensional shape formed by the compression members and the tension members is maintained by tension of the tension members, a variable damping force damper is disposed in at least the compression members or the tension members, the variable damping force damper is configured to generate a predetermined force in a longitudinal direction of the compression members or in a longitudinal direction of the tension members, and the variable damping force damper includes:

a coil; and an iron core connected to the compression members or connected to the tension members, or an iron core compression member is inserted in the coil.

10. The three-dimensional structure spacecraft according to claim 9, wherein the variable damping force damper further includes at least one latch, and the at least one latch secures the iron core at a predetermined position.

11. The three-dimensional structure spacecraft according to claim 10, wherein the latch includes a plurality of latches, and the coil is disposed between adjacent latches of the plurality of latches.

12. The three-dimensional structure spacecraft according to claim 9, further comprising:

a control unit comprising:

a tension detector;

a posture detection unit;

a damping force calculation unit;

an output unit; and a variable load unit, wherein the tension detector detects a current generated in the coil of the variable damping force damper and calculates a value of tension of the tension members, the damping force calculation unit receives data regarding a posture of the three-dimensional structure spacecraft from the posture detection unit, and calculates a target damping force and a target posture using the value of the tension and the data regarding the posture, the output unit uses data of the damping force and the posture to calculate at least one of a current and a voltage to be used to control the variable damping force damper, and the variable load unit transmits data regarding a damping force to the variable damping force damper.

13. A method for controlling a three-dimensional structure spacecraft that includes a plurality of compression members and a plurality of tension members, and in which three or more of the tension members of the plurality of tension members are connected to each end of the compression members, a three-dimensional shape formed by the compression members and the tension members is maintained by tension of the tension members, a variable damping force damper is disposed in at least either the compression members or the tension members, and the variable damping force damper is configured to generate a predetermined force in a longitudinal direction of the compression members or in a longitudinal direction of the tension members, the method comprising:

causing a control device to detect a change in a current or a voltage in the variable damping force damper;

causing the control device to calculate a damping force that is the predetermined force that reduces the change in the current or the voltage; and causing the control device to apply the current or the voltage corresponding to the damping force to the variable damping force damper.

14. The control method according to claim 13, wherein the control device determines whether the change in the current or the voltage has been reduced.

* * * * *